United States Patent
Cohen et al.

(10) Patent No.: US 7,468,840 B2
(45) Date of Patent: Dec. 23, 2008

(54) WAVELENGTH SELECTIVE OPTICAL SWITCH

(75) Inventors: Gil Cohen, Livingston, NJ (US); Yaron Silberberg, Lehavim (IL); Yossi Corem, Beit Shemesh (IL)

(73) Assignee: Xtellus, Inc., Florham Park, NJ (US)

( * ) Notice: Subject to any disclaimer, the term of this patent is extended or adjusted under 35 U.S.C. 154(b) by 119 days.

(21) Appl. No.: 10/492,484

(22) PCT Filed: Jun. 25, 2002

(86) PCT No.: PCT/IL02/00511

§ 371 (c)(1), (2), (4) Date: Oct. 14, 2004

(87) PCT Pub. No.: WO03/032071

PCT Pub. Date: Apr. 17, 2003

(65) Prior Publication Data

US 2005/0036202 A1    Feb. 17, 2005

Related U.S. Application Data

(60) Provisional application No. 60/327,680, filed on Oct. 9, 2001.

(51) Int. Cl.
*G02B 27/28* (2006.01)

(52) U.S. Cl. ........................ 359/495; 359/497; 349/196; 398/87

(58) Field of Classification Search .................. None
See application file for complete search history.

(56) References Cited

U.S. PATENT DOCUMENTS

| | | |
|---|---|---|
| 5,414,540 A | 5/1995 | Patel et al. |
| 6,285,500 B1 * | 9/2001 | Ranalli et al. ............... 359/497 |
| 6,327,019 B1 * | 12/2001 | Patel et al. .................. 349/196 |
| 6,529,307 B1 * | 3/2003 | Peng et al. .................. 359/256 |
| 6,532,318 B1 * | 3/2003 | Brophy et al. ................ 385/17 |
| 6,594,082 B1 * | 7/2003 | Li et al. ...................... 359/618 |
| 6,603,898 B2 * | 8/2003 | Doerr .......................... 385/24 |
| 6,606,197 B2 * | 8/2003 | Amin et al. .................. 359/618 |

* cited by examiner

*Primary Examiner*—Lee Fineman
(74) *Attorney, Agent, or Firm*—Darby & Darby

(57) ABSTRACT

A wavelength selective switch, in which an input optical signal is wavelength-dispersed and polarization-split in two angularly oriented planes. A polarization rotation device, such as a liquid crystal polarization modulator, pixelated along the wave-length dispersive direction such that each pixel operates on a separate wavelength channel, rotates the polarization of the light signal passing through the pixel, according to the control voltage applied to that pixel. The polarization modulated signals are then wave-length-recombined and polarization-recombined by means of similar dispersion and polarization combining components as were used to respectively disperse and split the input signals. The direction of the output signal is determined by whether the polarization of a particular wavelength channel was rotated by the polarization modulator pixel, or not. In this way, a fast, wavelength dependent, optical switch is provided, capable of use in WDM switching applications.

29 Claims, 9 Drawing Sheets

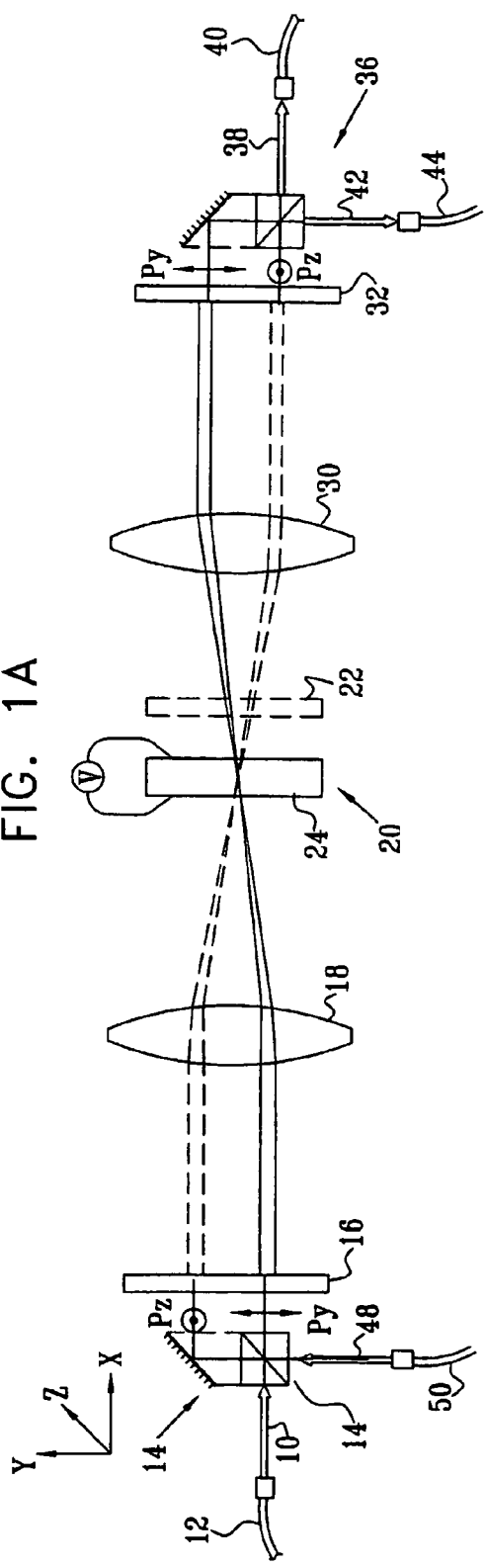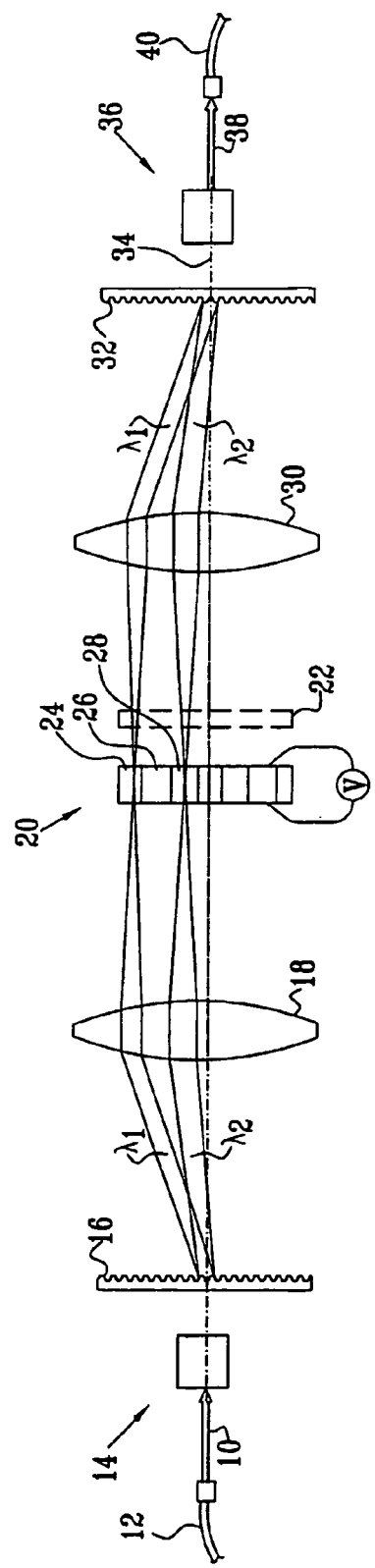

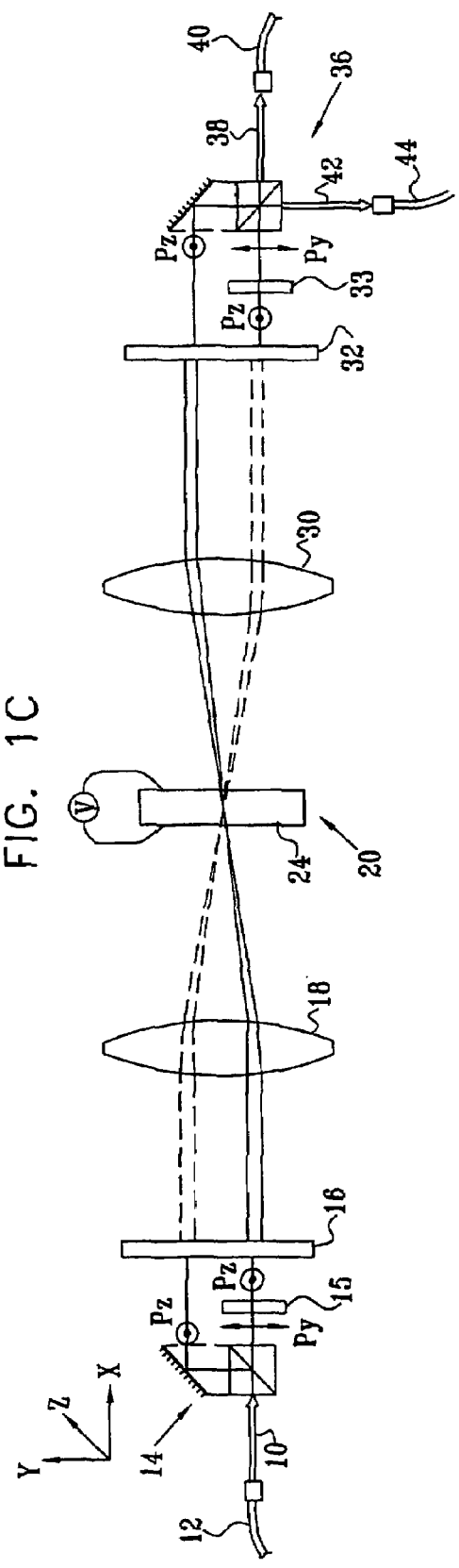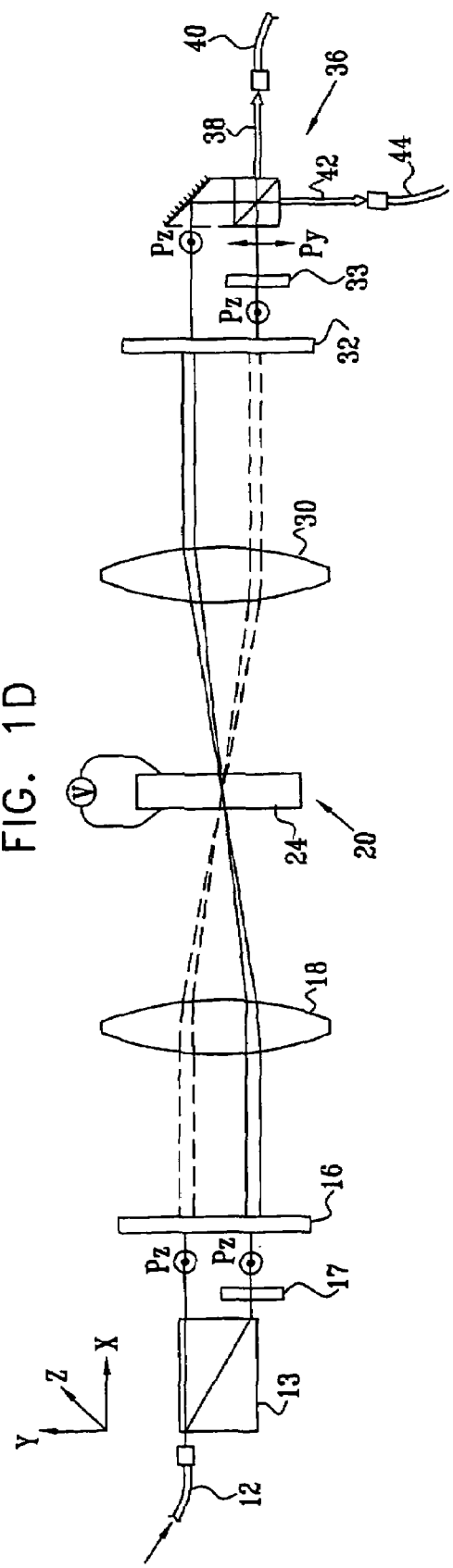

WAVELENGTH SELECTIVE OPTICAL SWITCH

FIELD OF THE INVENTION

The present invention relates to the field of devices for the switching of optical signals, according to the wavelength of the light bearing the information, by means of spatially selective polarization rotation of the light, especially for use in optical communication networks.

BACKGROUND OF THE INVENTION

Fast all-optical switching of information is an essential element of modem optical communication systems, enabling the slower electronic functions to be reserved only for the input and output terminals of the network, where the speeds required are those of individual channels, and not of the network throughput. In WDM systems, the information is segregated with regard to its source and destination according to the wavelength of the particular optical signal being transferred, and a switch for use in such a system must therefore be able to route each signal automatically according to its wavelength.

There exist a number of prior art devices for performing this function, such as that described in U.S. Pat. No. 5,414,540 to J. S. Patel et al., for "Frequency-selective optical switch employing a frequency dispersive element, polarization dispersive element and polarization modulating elements", hereby incorporated by reference in its entirety, and those devices mentioned in the references cited therein. However, most of those devices have one or more disadvantages in that they are either complicated to build, or to align, or utilize expensive component parts. For instance, the complete embodiment of the switch described in U.S. Pat. No. 5,414,540 contains on its input side, as illustrated in FIG. 11 of the patent, a wavelength dispersive element (not shown), a polarization dispersive element to displace the beam polarizations, such as a birefringent crystal, a half-wave plate element, a focusing element, another polarization dispersive element such as another birefringent crystal, and a segmented liquid crystal polarization modulator. The same number of components are required on the output side also. In the embodiment shown in FIGS. 1-4, the input elements include a polarization alignment component (not shown) to provide a specific polarization direction to the input beam, a wavelength dispersive element, a focussing element, a polarization displacement element such as a birefringent crystal, and a segmented liquid crystal polarization modulator. In addition, the same components are required on the output side also. Such a switch, in any of its embodiments, therefore contains a large number of components and is thus complicated to construct.

There therefore exists a need for a simple wavelength-selective optical switch, employing a smaller number of separate components than that of commonly available current devices.

The disclosures of each of the publications mentioned in this section and in other sections of the specification, are hereby incorporated by reference, each in its entirety.

SUMMARY OF THE INVENTION

The present invention seeks to provide a new wavelength selective optical switching device, which is simple in construction, and uses a small number of component parts, thus overcoming some of the disadvantages of previously available switches.

There is thus provided in accordance with a preferred embodiment of the present invention, a wavelength selective switch, wherein an input optical signal is spatially wavelength-dispersed and polarization-split in two angularly oriented planes, preferably perpendicular, planes. The wavelength dispersion is preferably performed by a diffraction grating, and the polarization-splitting by a polarizing beam splitter. A polarization rotation device, such as a liquid crystal polarization modulator, pixelated along the wavelength dispersive direction such that each pixel operates on a separate wavelength channel, is operative to rotate the polarization of the light signal passing through each pixel, according to the control voltage applied to the pixel. The polarization modulated signals are then wavelength-recombined and polarization-recombined by means of similar dispersion and polarization combining components as were used to respectively disperse and split the input signals. The direction of the resulting signal output is determined by whether the polarization of the particular wavelength channel was rotated by the polarization modulator pixel, or not. In this way, a fast, wavelength dependent, optical switch is provided, capable of use in WDM switching applications. According to a second preferred embodiment, the use of a reflecting surface at the plane of symmetry of the switch, after the polarization modulator, enables the number of components in the switch to be substantially reduced, to almost half that of the first embodiment.

There is further provided in accordance with another preferred embodiment of the present invention a wavelength dependent switch, comprising a polarization splitting element receiving an input beam including a plurality of wavelengths, and operative to spatially divide the input beam into separate polarization components, a wavelength dispersive element receiving the polarization-divided components of the input beam, and operative to spatially disperse each of the polarization-divided components of the beam into its wavelength components in a plane disposed at an angle to the plane in which the polarization components are divided, a polarization modulating element, pixelated along the direction of the wavelength dispersion such that each pixel is associated with a separate wavelength, each pixel of the polarization modulating element being operative to rotate the direction of the polarization of a beam passing through the pixel according to a control signal applied to the pixel, and a reflecting surface operative to reflect the beam after polarization modulation back through the wavelength dispersive element and the polarization splitting element, such that the beam outputs in a direction according to the control signal applied to the pixel. The polarization modulating element may preferably be a liquid crystal element.

According to yet another preferred embodiment of the present invention, there is further provided a wavelength dependent switch, including a first polarization splitting element receiving an input beam including a plurality of wavelengths, and operative to spatially divide the input beam into separate polarization components, a first wavelength dispersive element receiving the polarization-divided components of the input beam, and operative to spatially disperse each of the polarization-divided components of the beam into its wavelength components in a plane disposed at an angle to the plane in which the polarization components are divided, a polarization modulating element, pixelated along the direction of the wavelength dispersion such that each pixel is associated with a separate wavelength, each pixel of the polarization modulating element being operative to rotate the direction of the polarization of a beam passing through the pixel according to a control signal applied to the pixel, a second wavelength dispersive element receiving the polarization-modulated components of the beam, and operative to combine the wavelength components after passing through their wavelength associated pixels, into a single multi-channel beam, and a polarization combining element receiving the separate polarization components of the single multi-channel beam, and operative to combine the polarization components into a single output beam, each wavelength component of the output beam outputting in a direction according to the control signal applied to the pixel associated with the wavelength. The polarization modulating element may preferably be a liquid crystal element.

In accordance with yet another preferred embodiment of the present invention, there is provided a wavelength dependent switch, comprising sequentially:
(i) a polarization beam splitter having a first and second port, for receiving an input beam comprising at least two wavelength components, and operative to spatially split the input beam into beams of separate polarization components,
(ii) a dispersive element receiving the beams of separate polarization components, and operative to spatially disperse the wavelength components of each of the beams in a dispersion plane disposed at an angle to the plane in which the polarization components are split,
(iii) a polarization modulating element, pixelated along the direction of the dispersion such that each pixel is associated with a separate wavelength component, each pixel of the polarization modulating element being operative to rotate the direction of the polarization of light passing through the pixel according to a control signal applied to the pixel, and
(iv) a reflecting surface operative to reflect the light after polarization modulation, back through the dispersive element and the polarization beam splitter, such that each wavelength component of the light is directed to one of the two ports according to the control signal applied to the pixel associated with the wavelength.

In the above-described switch, the polarization modulating element may preferably be a liquid crystal element. Furthermore, the angle may be such that the dispersion plane is essentially orthogonal to the plane in which the polarization components are split. Additionally and preferably, the separate polarization components may be two orthogonal components.

There is further provided in accordance with yet another preferred embodiment of the present invention, a switch as described above, and also comprising circulators at each of the first and second ports, such that the switch is operative to switch a wavelength component of a signal input through either of the circulators such that it outputs either of the circulators according to the control signal applied to the pixel associated with the wavelength.

In accordance with still another preferred embodiment of the present invention, there is provided a wavelength dependent switch, comprising:
(i) a polarization beam splitter having a first input port, for receiving an input beam having at least two wavelength components, and operative to spatially split the input beam into beams of separate polarization components,
(ii) a first dispersive element receiving the beams of separate polarization components, and operative to spatially disperse the wavelength components of each of the beams in a dispersion plane disposed at an angle to the plane in which the polarization components are split,
(iii) a polarization modulating element, pixelated along the direction of the dispersion such that each pixel is associated with a separate wavelength component, each pixel of the polarization modulating element being operative to rotate the direction of the polarization of light passing through the pixel according to a control signal applied to the pixel,
(iv) a second dispersive element receiving the light, and operative to combine the separate wavelength components of each of the beams into multi-wavelength beams, and
(v) a polarization beam combiner having two output ports, for receiving each of the multi-wavelength beams, and operative to combine the polarization components such that each wavelength component is directed to one of the two output ports according to the control signal applied to the pixel associated with the wavelength.

In the previously-described switch, the polarization modulating element may preferably be a liquid crystal element. Furthermore, the angle may be such that the dispersion plane is essentially orthogonal to the plane in which the polarization components are split. Additionally and preferably, the separate polarization components may be two orthogonal components.

There is further provided in accordance with still another preferred embodiment of the present invention, a wavelength dependent switch as described above, and also comprising a second input port disposed essentially orthogonal to the first input port, such that the switch is operative to switch a wavelength component of a signal input to either of the input ports, to either of the output ports, according to the control signal applied to the pixel associated with the wavelength.

BRIEF DESCRIPTION OF THE DRAWINGS

The present invention will be understood and appreciated more fully from the following detailed description, taken in conjunction with the drawings in which:

FIGS. 1A and 1B schematically illustrate different views of a wavelength selective optical switch, constructed and operative according to a first preferred embodiment of the present invention. FIG. 1A is a view of the device from the polarization splitting plane, while FIG. 1B is a view of the same device from the wavelength dispersion plane, orthogonal to the polarization splitting plane;

FIGS. 1C and 1D are schematic illustrations of simplifying adaptations of the 2×2 switch shown in FIGS. 1A and 1B, enabling its use as a 1×2 switch, or as a 2×1 switch when used in the reverse direction;

DETAILED DESCRIPTION OF PREFERRED EMBODIMENTS

Figure 1E:
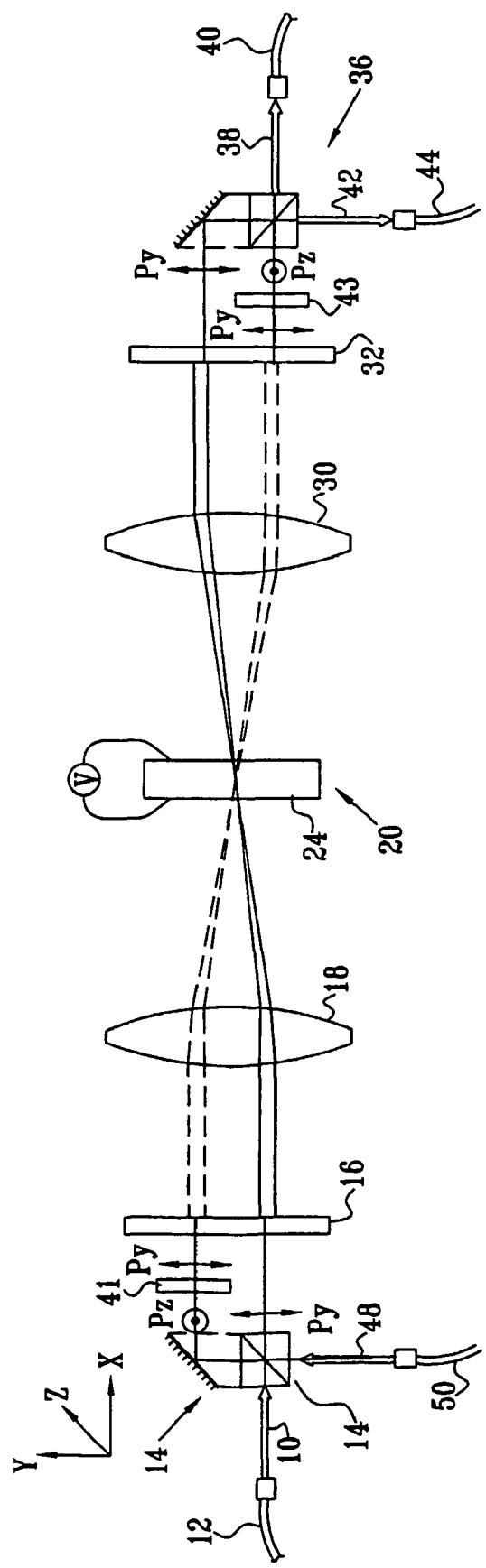
FIG. 1E illustrates schematically yet another embodiment of a wavelength selective optical switch, according to a further preferred embodiment of the present invention, in which polarization dependent loss is compensated for either position of the switch.

Reference is now made to FIGS. 1A and 1B, which illustrate schematically different views of a wavelength selective optical switch, constructed and operative according to a first preferred embodiment of the present invention. FIG. 1A is a view of the device from one plane, known as the polarization splitting plane, while FIG. 1B is a view of the same device as seen from a plane preferably orthogonal to the first and known as the wavelength dispersion plane. The operation of the wavelength selective optical switch can be understood by reference simultaneously to the signal paths shown in FIGS. 1A and 1B.

An input optical signal 10, such as would be obtained after collimation from the end of an optical fiber 12, is input into a polarization beam splitter (PBS) 14, shown in FIG. 1A as a split prism PBS, though it is to be understood that other preferred types of PBS may also be used for this function. The PBS is so orientated that it preferably splits the input signal into its two orthogonal polarization directions, marked $P_y$ and $P_z$, where $P_y$ is in the plane of the paper, and $P_z$ is out of the plane of the paper in the embodiment shown. The position of the axes x, y, and z are defined in FIG. 1A. The two polarization components of the signal, also commonly known as the p and the s components, are incident on a dispersive element, such as a diffraction grating 16 in the preferred embodiment shown. The grating is operative to disperse the different wavelengths $\lambda_1, \lambda_2, \lambda_3, \ldots \lambda_n$ into different directions, according to their wavelength. The grating is aligned such that the wavelength dispersion direction, shown in the plane of FIG. 1B, is preferably perpendicular to the polarization splitting direction, shown in the plane of FIG. 1A. The optical signal is thus now wavelength-dispersed and polarization-split in two different planes, preferably orthogonal to each other. Though the gratings in the embodiment shown in FIGS. 1A and 1B are transmissive gratings, it is understood by one of skill in the art that the gratings, either one or both, could equally be reflective gratings. Similarly, in the embodiment shown in FIGS. 2A and 2B hereinbelow, the single grating could be a reflective grating.

The dispersed components of the signal are then imaged by means of a lens 18 located at a distance equal to its effective focal length from the diffraction grating onto a pixelated polarization rotation element, 20, such as a pixelated liquid crystal device, which is divided up into pixels, 24, 26, 28 ... one for each wavelength channel to be directed by the switch. The light from each dispersed wavelength range is imaged onto a separate pixel of the device, as is seen in FIG. 1B. For the sake of clarity, only two dispersed wavelengths are shown in FIG. 1B, but it is to be understood that there can be as many wavelength channels as there are pixels. FIG. 1A shows a view of the switch from the side, and hence only pixel 24 is shown, carrying the signals of wavelength $\lambda_1$. Components of the signal having polarization in the $P_z$ direction and in the $P_y$ direction both pass through pixel 24, but laterally displaced from each other. The pixels are switched by means of control voltages V applied through an array of transparent electrodes on the liquid crystal surfaces, as is known in the art of passive matrix liquid crystal arrays. Alternatively and preferably, the liquid crystal array may be an active matrix type, with individual thin film transistors providing the drive current for each individual pixel.

After passing through the liquid crystal device 20, the light signals are imaged, preferably by means of a second focusing lens 30, onto another dispersive grating 32, similar in characteristics to the first grating 16. According to a preferred embodiment of the present invention, the polarization rotation element is preferably located at the back focal plane of the focusing lens 18, and at the front focal plane of the lens 30, such that the overall assembly has a 4-f configuration, for optimum optical performance. Grating 32 is operative to recombine the different wavelengths $\lambda_1, \lambda_2, \lambda_3, \ldots \lambda_n$ coming from their respective wavelength-dispersed directions, into a single beam path 34 in the wavelength-dispersed plane, though still spatially split into its two polarization components in the polarization-displaced plane. These polarization components are then input to a polarization beam combiner (PBC) 36, where the polarization components are recombined to form an output signal 42, which can be collimated and input into a fiber 44 for onward transmission after switching.

The switch is operated by activation of the pixels of the liquid crystal device. Application of the required control voltage V to a pixel causes the polarization passing therethrough to rotate, while inactivation of the liquid crystal pixel allows the signal to pass through with its polarization unchanged. Thus, as is shown in the preferred embodiment of FIG. 1A, when, the relevant pixel 24 of the liquid crystal device 20 for wavelength channel $\lambda_1$ is not activated, the polarizations $P_y$ and $P_z$, are unrotated, and the reconstituted signal outputs from the polarization beam combiner 36 into fiber 44. For reasons of clarity, the output fiber 44 is not shown in FIG. 1B, as it is located out of the plane of the drawing. It should be noted that the output beam 42 is directed orthogonally to that of the input beam 10, even though the polarizations of the two components of the beam have not been changed by the liquid crystal. This is a result of the focusing of the beams by means of two lenses through the liquid crystal device 20, causing the two laterally displaced polarization components of the beam to cross over and thus to change their mutual positions, such that the two components behave as if their polarizations had been rotated by the liquid crystal.

If, however the pixel 24 of the liquid crystal device 20 is activated in such a manner as to introduce a phase change of $\pi$ for both polarizations, the polarizations $P_y$ and $P_z$, are rotated such that the polarization $P_y$ becomes $P_z$ and the polarization $P_z$ becomes $P_y$. When recombined in the polarization beam combiner 36, and taking into account the beam crossover because of the imaging lenses, the resultant signal exits in the direction 38 parallel to the entry direction, and inputs a second output fiber 40.

The above-described optical arrangement therefore behaves as a 1×2 optical switch device which can direct an input signal 10 of wavelength $\lambda_1$ into one of two output fibers 40, 44, by means of switching a liquid crystal pixel 24. It is understood that by reversing the direction of operation of the switch, it operates as a 2×1 switch, with inputs on either of fibers 40 and 44 being directed to the input fiber 12 according to the setting of the liquid crystal pixels.

Each wavelength channel shown in FIG. 1B has its own liquid crystal pixel, the switching of which causes the light of that wavelength to input into one or other of the output fibers.

The switch is thus able to direct wavelength separated packets of optical information into different paths, according to their wavelengths, by means of a switching routine of control voltages applied to the various wavelength designated pixels of the liquid crystal device.

It should be noted that the novel construction and operation of the switch of the present invention makes it essentially polarization independent, besides any residual polarization dependent loss which there may be in the grating or in the PBS. This feature is important for use in fiber optical systems, since, as is known, the polarization of a signal transmitted down an optical fiber is generally randomized. The reason for this polarization independence is that at the input 10 to the PBS, independently of the polarization direction of the input signal, any input signal can be split into two orthogonal components having polarization directions parallel to $P_y$ and $P_z$ relative to the orientation of the PBS, and each component is separately switched or not switched to output 42 or 38, according to the state of the liquid crystal pixel for that wavelength. On recombination of these two polarization components, the original signal is regained. It is understood that if the polarization direction of the input signal happens by chance to be exactly parallel to the $P_y$ or the $P_z$ direction, then light with only one component of polarization traverses the switch.

According to another preferred embodiment of the present invention, a second input fiber 50 is disposed at the orthogonal input port of the polarization beam splitter 14. The input signal 48 from the second input fiber 50, after passing through the polarization beam splitter 14, has polarizations reversed from those shown in FIG. 1A. Thus, the upper path shown in FIG. 1A has $P_y$ polarization direction, while the lower path has a $P_z$ polarization. Therefore, on passage through the liquid crystal device, oppositely to the effect on the input signal from fiber 12, activation of a pixel sends the input signal from fiber 50 out to fiber 44, and non-activation directs it to fiber 40. This preferred embodiment is therefore operative as a 2×2 optical switching network. Larger switching networks can be constructed by cascading such switches. As is evident from all of the above description, it is to be understood that by using only part of the capabilities of the switch of the present invention, 2×1, 1×2, or even 1×1 switches can also be implemented, the last mentioned being useful as a channel blocker.

According to a further preferred embodiment, a half wave plate 22 can be inserted close to the liquid crystal device 24 in order to minimize the polarization dependent loss (PDL). Such a half wave plate rotates through 90° the polarization of light passing through it, such that in the example shown in FIG. 1A, polarization $P_y$ is converted to $P_z$ and vice versa. Therefore, any difference in polarization dependent loss suffered by the incoming light during transit through the left hand side of the switch system, i.e. before impinging on the half wave plate, will be compensated during passage in the right hand side of the switch system, since the polarization directions of the orthogonally polarized components are interchanged and the switch is approximately right-left symmetrical. It should be noted that since the polarization directions are reversed after passage through the half-wave plate the output for an unactivated pixel becomes port 40 and for an activated pixel, port 44. Alternatively and preferably, any other polarization rotating element which rotates the polarization direction by 180°, such as a Faraday rotator, can be used instead of a half wave plate for this purpose.

Reference is now made to FIGS. 1C and 1D, which schematically illustrate wavelength selective optical switches, constructed and operative according to two further preferred embodiments of the present invention. The switches shown are simplified embodiments of those shown in FIGS. 1A and 1B, for use as a 1×2 or as a 2×1 switch. In the embodiment shown in FIG. 1C, the multi-wavelength input signal 10 is applied through a single input fiber 12, and is split into its orthogonal polarization components $P_y$ and $P_z$ by means of the input PBS 14. A half wave plate 15 is located at one output of the PBS, and is operative, in the embodiment shown, to rotate the $P_y$ component into the $P_z$ direction. Both of the polarization-split channels thus now have the same polarization direction, $P_z$ in the embodiment shown. These components are then both passed through the dispersion grating 16, where they are wavelength dispersed in the dispersion plane (not shown) as shown in the embodiment of FIGS. 1A and 1B. However, unlike that embodiment, both signals now have the same polarization direction, and this enables the use of a high efficiency grating 16, thereby providing the switching array with a significantly lower insertion loss than that shown in the previous embodiment of FIGS. 1A and 1B. After the polarization rotating device, which is operative in determining which wavelength signal has its polarization switched and which not, and the wavelength combining grating 32, one of the polarization-split channels has a farther half wave plate 33 in its path, operative in this embodiment to rotate the $P_z$ component back into a $P_y$ component, so that the output PBS 36 can direct each signal to its determined output, along path 38 or 42, depending on the state of the relevant pixel of the liquid crystal device. It should be noted that since the polarization of the light in both polarization dispersion planes of the switch is identical, there is no need for a half wave plate 22 to compensate for polarization dependent losses, as was shown in the embodiments of FIGS. 1A and 1B.

The embodiment shown in FIG. 1D is similar to that shown in FIG. 1C, in that the switch is constructed such that the liquid crystal polarization rotating element operates on parallel polarization signals. However, in the embodiment of FIG. 1D, the input signal 12 is split into its orthogonal polarization components, one of which is rotated to bring both components parallel, preferably by means of a birefringent crystal such as $YVO_4$ 13 with a half wave plate 17 on one half of its output port, as is known in the art. Such a component, in an integrated form, is available commercially from several companies, including JDSU-Casix Corp., of Fuzhou, China, and is known by Casix as a C-polarizer. The result is the generation of two spatially-displaced, parallel-polarized components of the input signal, similar to those generated in the embodiment of FIG. 1C, but using a simpler and more compact optical arrangement using less components. The remainder of the 1×2 switch of this preferred embodiment is identical to that described in relation to the embodiment of FIG. 1C.

Reference is now made to FIG. 1E, which illustrates schematically yet another embodiment of a wavelength selective optical switch, according to a further preferred embodiment of the present invention. The embodiment shown in FIG. 1E overcomes a drawback in the use of a single half wave plate 22 close to the liquid crystal element to eliminate polarization dependent losses (PDL), as shown in the embodiment of FIG. 1A. In the scheme of FIG. 1A, PDL is effectively compensated for so long as the liquid crystal is unswitched. As soon as the operative pixel of the liquid crystal is switched, another 180° phase shift is introduced into the optical path, thereby nullifying the effect of the 180° phase shift introduced by the half wave plate. The PDL is therefore no longer compensated when the switch is activated.

In the switch of FIG. 1E, a small half wave plate 41 is inserted into the path of the upper polarization-split beam exiting the input PBS 14, such that in the example shown, its polarization is rotated from $P_z$ to $P_y$. Both polarization dispersion channels then have the same polarization direction, $P_y$, and therefore traverse the switch path without engendering essentially different levels of PDL. At the output PBS 36, a similar half wave plate 43 is inserted into the same channel as that having the half wave plate at the input, thereby reverting the polarization direction back to $P_z$, for outputting as in the original scheme of FIG. 1A. Since both beams traverse the liquid crystal with the same polarization direction, and without any additional half wave plate in its vicinity, switching of the liquid crystal pixel has no effect on the PDL compensation of the channels. The only difference in transmission between the two liquid crystal states is that engendered by the difference in grating efficiency for the two polarization states, since the transmission efficiency of the input through fiber 12 is related to the $P_z$ insertion loss at both gratings, while that of fiber 50 is related to the $P_y$ insertion loss for both gratings. This difference is much smaller than the PDL differences.

It should be mentioned that for the preferred embodiments illustrated in FIGS. 1C to 1E, as in all of the following embodiments also, the drawings show views of the polarization splitting plane only, as it is primarily in this respect that these embodiments differ from that shown in FIGS. 1A. It is to be understood, however, that for each of the drawings in FIGS. 1C to FIG. 7, there is also a corresponding wavelength dispersion plane, similar to that of FIG. 1B, oriented at an angle, generally orthogonally, to the polarization splitting planes shown in FIGS. 1C to FIG. 7.

Figure 2A:
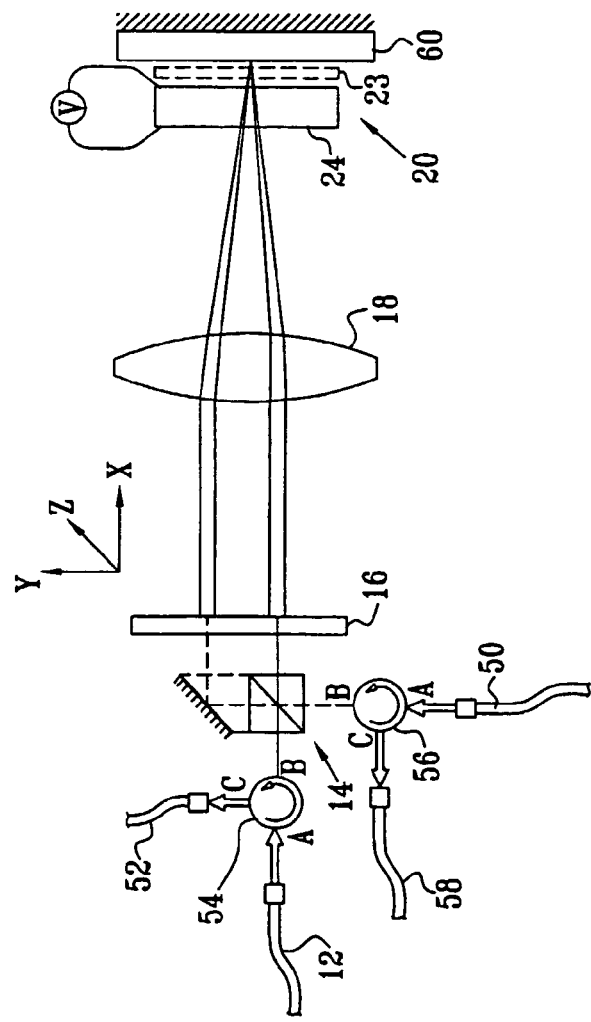
FIGS. 2A and 2B schematically illustrate a wavelength selective optical switch, constructed and operative according to a further preferred embodiment of the present invention, using a reflective surface to reduce the size and complexity of the switch.
Figure 2B:
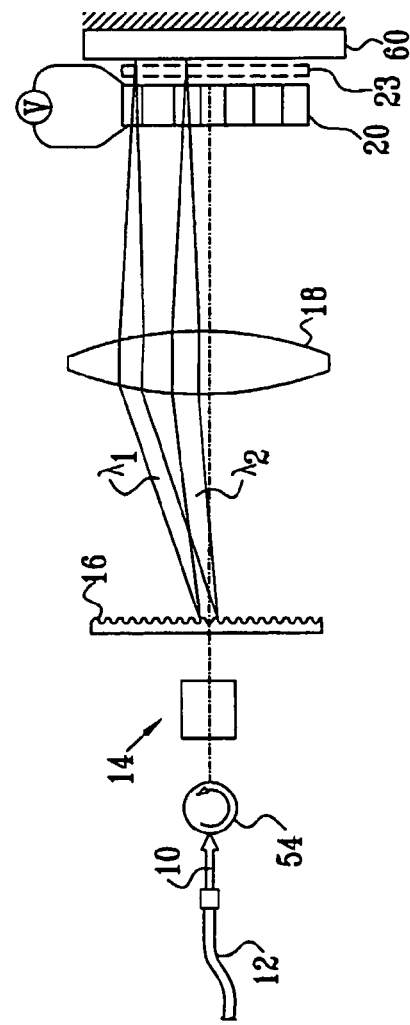

Reference is now made to FIGS. 2A and 2B, which schematically illustrate a reflective wavelength selective optical switch, constructed and operative according to a further preferred embodiment of the present invention. FIG. 2A is a view of the device from the polarization split plane, while FIG. 2B is a view of the same device from the wavelength dispersion plane. In the embodiment of FIGS. 2A and 2B, a reflecting surface 60 is added after the liquid crystal device 20, so that the polarized components of the beam are returned back along their incident path. This embodiment is thus similar in construction to the embodiment of FIGS. 1A and 1B, except that use is made of the symmetry of the device on either side of the polarization rotating component, in order to simplify construction, and to reduce even further the number of components used. Though the reflecting surface 60 in the embodiment of FIGS. 2A and 2B is shown as a separate device, according to a further embodiment, the reflecting surface can be applied to the back side of the liquid crystal device 20. The other components in the embodiment of FIGS. 2A and 2B are labeled with the same characters as in FIGS. 1A and 1B, and in general, for the incident signals, they have essentially identical functions to those in FIGS. 1A and 1B. In addition, with respect to the output signals, after passage through the liquid crystal device 20 and after reflection from the reflective surface 60 of FIGS. 2A and 2B, these components have the equivalent functions to those of the output signals of FIGS. 1A and 1B, after transmission through the liquid crystal device 20 of FIGS. 1A and 1B. Thus, for example, the diffraction grating 16 is operative both to wavelength disperse the input signals, and to wavelength combine the output signals. Likewise, the single imaging lens 18 both images the input signals from the grating 16 onto the plane of the liquid crystal element 20, and confocally images the output signals from the plane of the liquid crystal element onto the grating 16.

The polarization beam splitter 14 of the input signals also acts as a polarization beam combiner for the output signals. However, since the input and output signals both pass through this same component, unlike the embodiment of FIGS. 1A and 1B, both input and output fibers must be connected to this component, and a means provided for separating the input from the output signals. This is preferably achieved by the addition of circulators 54 and 56 at the ports of the polarization beam splitter/combiner 14 in the embodiment shown in FIGS. 2A and 2B. The circulator 56 is not shown in FIG. 2B, as it lies perpendicular to the plane of the drawing, and beneath the polarization beam splitter/combiner 14.

The signal having the wavelength which it is desired to be switched is input from fiber 12 to port A of circulator 54. Since the direction of propagation of the circulator shown in the preferred embodiment of FIG. 2A is anti-clockwise, the signal exits the circulator at the port B fiber, is collimated by a lens at the end of the fiber and enters the polarization beam splitter/combiner 14. For a particular wavelength channel, for instance $\lambda_1$ in the embodiment shown, if the pixel 24 for that channel is not activated, the polarization of the components of the signal are unchanged, but since the polarization component positions are switched because of the imaging process onto the liquid crystal device pixels, the signal returns after reflection and polarization recombination, to port B of circulator 56, which then outputs the signal via port C to output fiber 58. If on the other hand, the pixel 24 associated with the wavelength channel $\lambda_1$ is activated and generates a phase difference of $\pi/2$, the signal has its polarization components reversed, and consequently, after recombination in the polarization beam splitter/combiner 14, is focused by the collimation lens to output to port B of circulator 54, and from there to port C and out to fiber 52. Thus, an input signal on fiber 12, having a wavelength $\lambda_1$, can be switched between output fibers 58 and 52, according to the setting of the control voltage of pixel 24. In the same way, any other wavelength within the range of the dispersive element 16 can be switched by means of a control voltage applied to the appropriate pixel 24, 26, 28, . . . of the liquid crystal device 20.

According to another preferred embodiment of the present invention, a second input fiber 50 is disposed at the input port A of the circulator 56, and inputs its signal from port B to the polarization beam splitter/recombiner 14. On return from its round trip through the switch, the signal is directed either to fiber 52 if the relevant pixel is not activated, or to fiber 58 if the pixel is activated. This embodiment, like that of FIGS. 1A and 1B, can also therefore be used as a 2×2 optical switching network.

Figure 3:
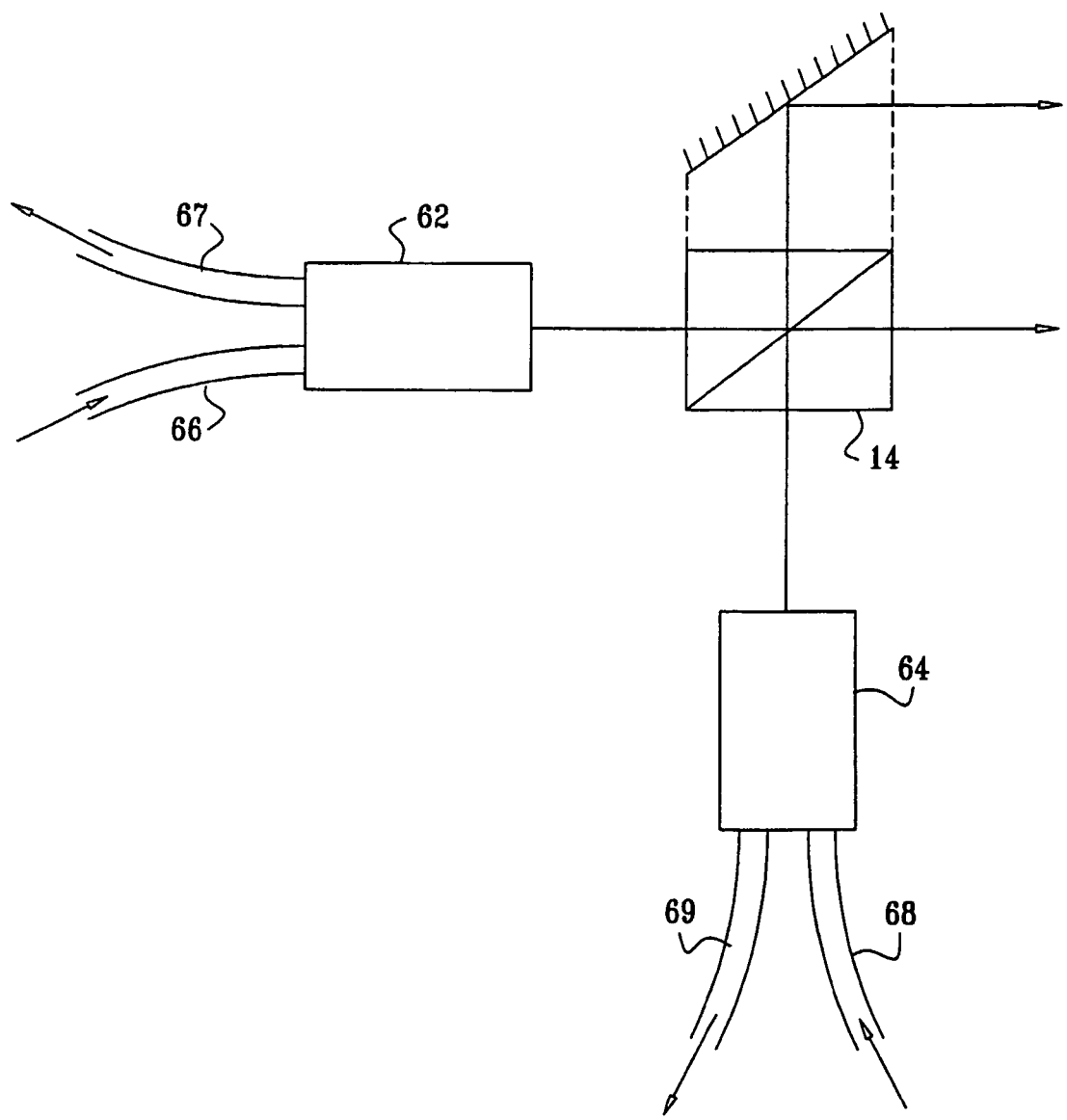
FIG. 3 schematically illustrates the use of dual fiber collimators as input/output devices in the embodiment shown in FIGS. 2A and 2B.

According to yet another preferred embodiment of the present invention, the input and output signals can be separated by using dual fiber collimators instead of the circulators shown in the embodiment of FIGS. 2A and 2B. Such an embodiment is shown in FIG. 3, where only the inputs to the PBS are shown. The first channel of the 2×2 switching network has a dual fiber collimator 62, with input fiber 66 and output fiber 67. The second channel of the 2×2 switching network has a dual beam collimator 64, with input fiber 68 and output fiber 69. Operation of the switch is otherwise similar to that using circulators, as shown in FIGS. 2A and 2B.

In order to decrease the PDL of the reflective switches of FIGS. 2A and 2B, according to a further preferred embodiment of the present invention, a quarter wave plate 23 may added in juxtaposition to the polarization modulating element 24. Since the beam makes two traverses through this plate, the effect is that of a half wave plate 22, as described in relation to FIGS. 1A and 1B. Alternatively and preferably, any other polarization rotating element which rotates the polarization direction by 90°, such as a Faraday rotator, can be used for this purpose instead of a quarter wave plate.

Figure 4A:
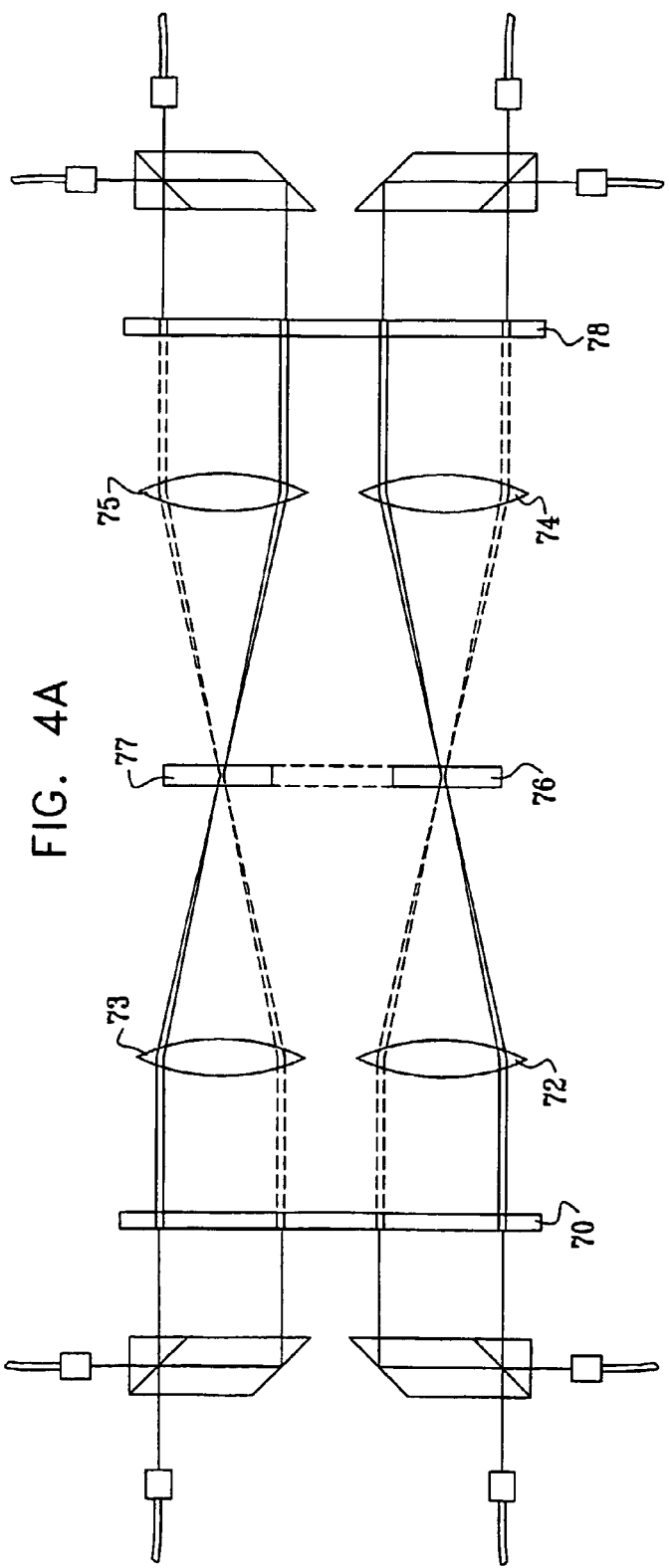
FIG. 4A is a schematic illustration of a stacked, multiple channel, wavelength selective switch, according to yet another preferred embodiment of the present invention, using common dispersive elements.

Reference is now made to FIG. 4A, which is a schematic illustration of a multiple channel wavelength selective switch module, according to yet another preferred embodiment of the present invention. The embodiment shown in FIG. 4 is similar to that shown in FIGS. 1A and 1B except that a pair of 2×2 switches are stacked one on top of the other, and preferably utilize a common dispersive element 70 but separate focussing lenses, 72, 73 74, 75 and a common wavelength combining element 78. Each switch utilizes its own liquid crystal array 76, 77, in order to enable independent operation for the two switches. Such an embodiment thus enables a more compact and component economic device to be constructed in a single package. Alternatively and preferably, a single liquid crystal array may be used, as indicated by the dotted lines joining what would then be the two "parts" 76, 77 of the single element, with the pixels of separate rows being used to control the switching of each stacked switch.

Figure 4B:
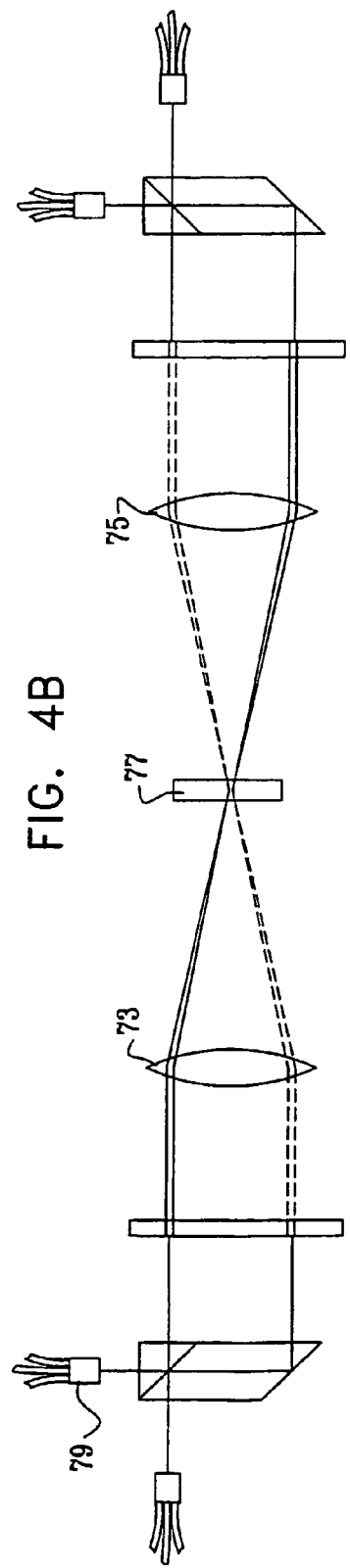
FIG. 4B is a schematic illustration of a multiply parallel wavelength selective switch with multiple inputs and outputs, in which the multiple input and output fibers use the same optical elements.

Reference is now made to FIG. 4B, which is a schematic illustration of another preferred embodiment of a wavelength selective switch module of the present invention. The switch array shown in FIG. 4B is similar to that shown in FIG. 1A, or in half of the multiple channel embodiment of FIG. 4A except that at each input and output, instead of a single fiber collimator, a multiple fiber collimator is used. In the preferred embodiments shown in FIG. 4B, triple fiber collimators 79 are shown, which are constructed by having three fiber in the same ferrule in front of the collimating lens of the collimator. Such an embodiment enables the switch to work as a multiply parallel, wavelength selective switch, which is useful for providing switching capability with channel redundancy, as is known in the art. It is to be understood that although such a multiply parallel application has been illustrated for the switching application shown in FIG. 4B, it can be utilized in any of the switch applications shown in the other embodiments described in this specification, where such use is relevant, whether transmissive or reflective, and whether configured as a single switch, or as a stacked array of switches.

Figure 5:
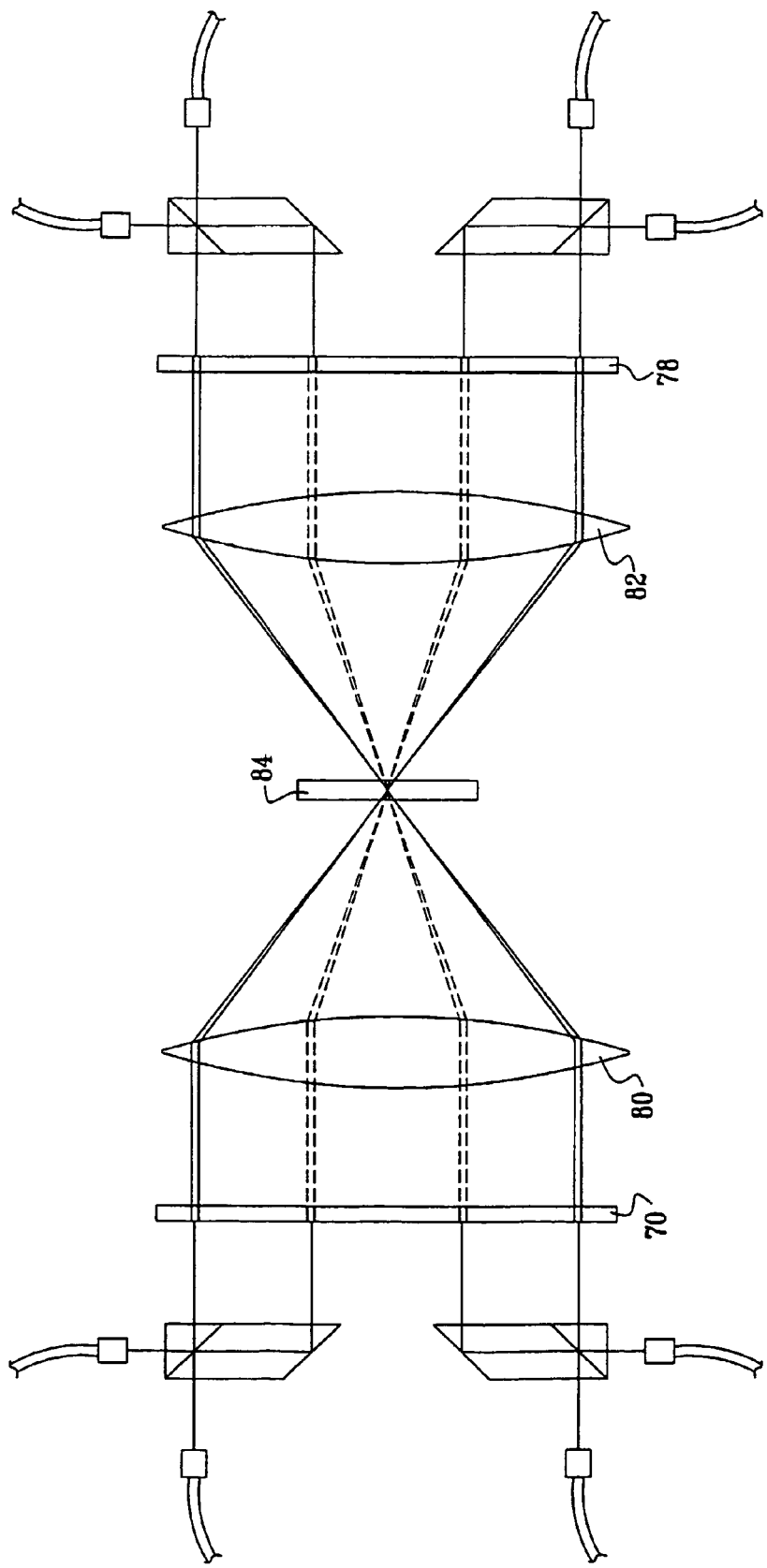
FIG. 5 is a schematic illustration of a stacked, multiple channel, wavelength selective switch, according to yet another preferred embodiment of the present invention, similar to that shown in FIG. 4A, but using also common focussing lenses and a common liquid crystal element.

Reference is now made to FIG. 5 which is a schematic illustration of another multiple channel wavelength selective switch, according to a further preferred embodiment of the present invention. This switch differs from that shown in FIG. 4A in that common focussing lenses 80, 82 are used, as well as a single liquid crystal array 84 which serves all of the wavelength channels in both separate switches. This allows even greater economy of component use in the switch.

Figure 6:
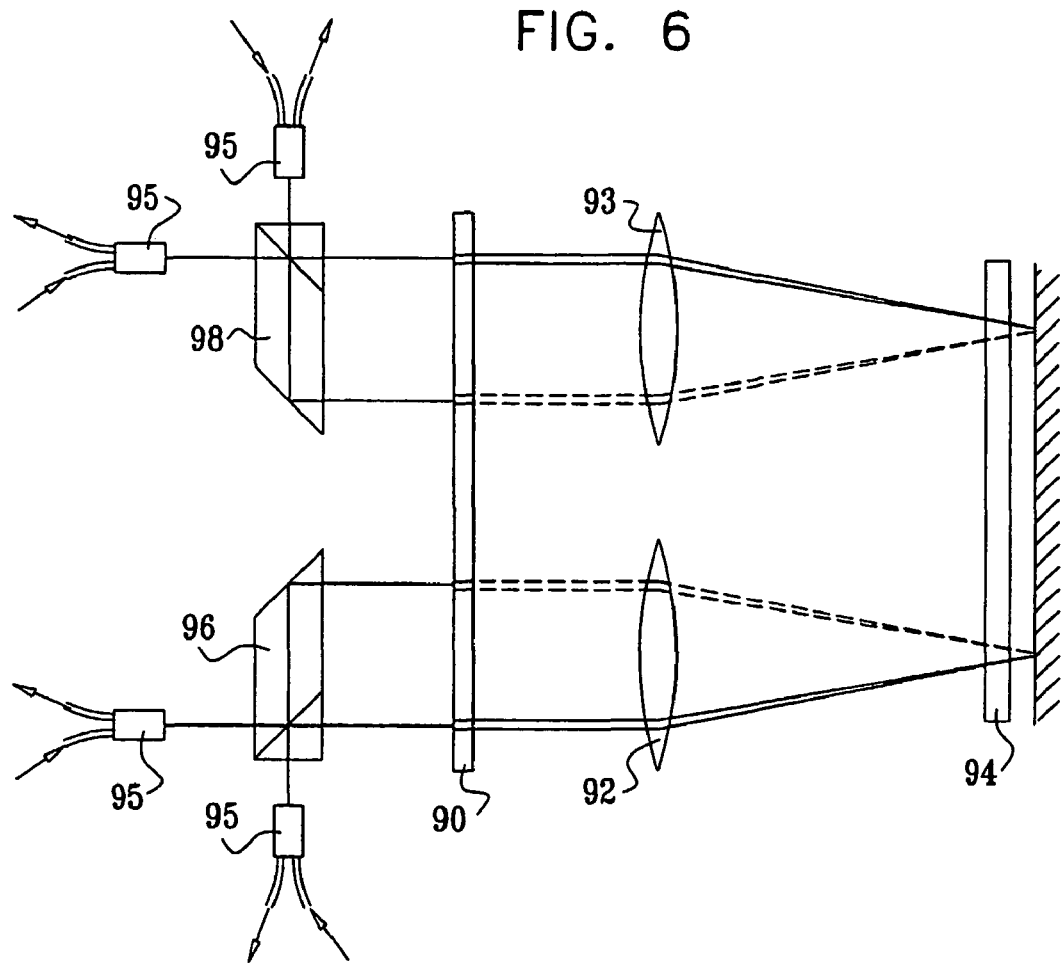
FIG. 6 is a schematic illustration of a stacked, multiple channel, reflective wavelength selective switch, according to yet another preferred embodiment of the present invention, using a common diffraction grating, focussing lens and liquid crystal element.

Stacking of switches, as shown in the transmissive embodiments of FIGS. 4A, 4B and 5, can also be performed for the reflective wavelength selective switch embodiments shown in FIGS. 2A and 2B. One preferred example of such a stacked switch module is shown in FIG. 6, in which some of the operative elements of the switches, namely the grating 90 and the reflective liquid crystal element 94, are common. In order to maintain planar geometry at the reflective liquid crystal plane, separate focusing lenses 92, 93, are required. Individual polarization beam splitters 96, 98 are used, as in the transmissive embodiments, to input and output the signals. In the preferred embodiment of the reflective switch array shown in FIG. 6, the input and output beams of each channel are separated by means of dual fiber collimators 95, as shown in FIG. 3, to illustrate the difference of this preferred aspect of these embodiments from that shown in FIGS. 2A and 2B where circulators are used. It is to be understood that such a stacked switch module can also be constructed with less of its components common, similar to the embodiment shown in FIG. 4A.

Figure 7:
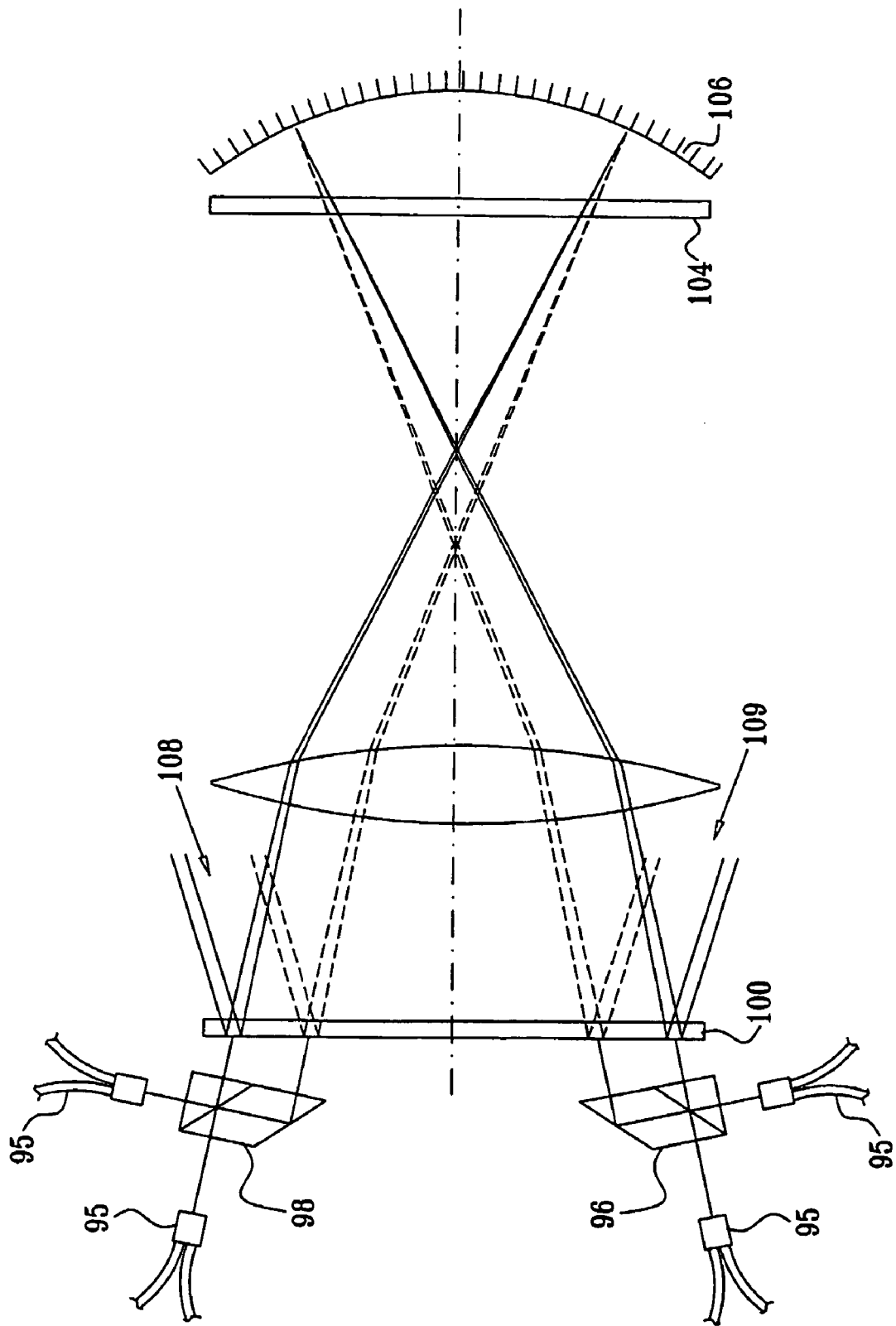
FIG. 7 is a schematic illustration of a reflective wavelength selective switch, similar to that shown in FIG. 6, but using also a common focussing lens for both channels.

Reference is now made to FIG. 7 which is a schematic illustration of another reflective multiple channel, wavelength selective switch, according to a further preferred embodiment of the present invention. This switch differs from that shown in FIG. 6 in that the focussing lens 102 too is common to both channels. In order to achieve correct reflective operation in this embodiment, the reflective surface 106 associated with the liquid crystal element 104 is preferably constructed with a concave profile, with a radius of curvature equal to the focal length of the lens 102, such that any beam focussed by the lens onto the reflective surface is returned along its incident path. In order to maintain the correct angle of optical incidence for this to occur independently for each channel, the PBS's 96, 98 operating as the incident and receiving units must preferably be aligned at an angle such that after refraction through the lens 102, the incident beams are directed at the correct angle onto the concave reflective surface 106, and impinge thereon at spatially different positions. If the PBS's were to be aligned axially, the beams would be focussed at essentially the same points and could not be independently controlled by the liquid crystal element 104.

In the preferred embodiment shown in FIG. 7, the grating 100 is shown as a transmissive grating, with the PBS's 96, 98, located in the positions shown in FIG. 7. Alternatively and preferably, a reflective grating may be used, in which case the PBS's are located such that the input and output beams of each channel are directed along the directions indicated by the arrows 108, 109.

In the above-described embodiments of the present invention, the pixels are described as being activated when a voltage is applied to them to rotate the polarization direction, or un-activated when no voltage is applied, and the polarization of traversing light is unaffected. In practice, this description is an idealized description since in general, even without the application of any drive voltage, there will be some polarization rotation of the traversing light signals because of basic birefringence of the liquid crystal material. In general therefore, the unactivated state is understood to mean that state obtained when a polarization rotation of $2n\pi$ is obtained, where n is an integer not including zero, even if that state requires the application of a voltage to the element in question. The "voltage" required to activate that element is then the difference in voltage required between the unactivated and the activated state. Furthermore, the voltage required to switch an element may be a function of the wavelength of the light being switched, and the switch controller is thus preferably programmed to supply the correct switching voltage to each pixel in accordance with the wavelength of the light traversing that pixel.

In FIGS. 1A, 1B, 2A and 2B, the light beams are shown having a finite width only within the dispersive bounds of the switch, in order to illustrate the focusing effect through the liquid crystal element. For the passage through the entry and output components, including the PBS's, the beams are delineated by single lines only down the center of the beam, for reasons of clarity. It is thus not meant to be understood from the drawings that the beam width changes in passage through the dispersive elements.

Although the above preferred embodiments of the wavelength selective switch have been described using a liquid crystal element as the polarization rotating element, it is understood that the invention is equally operable using any other suitable type of controlled polarization rotating element known in the art. Likewise, although a grating has been used as the wavelength dispersing element, it is understood that the invention is equally operable using any other type of wavelength dispersing element. Likewise, although fibers have been shown to represent the input and output means for the optical signals, these being the most common medium for transferring optical information, it is understood that the invention is not meant to be limited to this type of input and output means.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A wavelength dependent switch, comprising in sequence:
   a polarization beam splitter having at least a first input port, for receiving at least one input beam having at least two wavelength components, said polarization beam splitter being operative to spatially split each of said at least one input beam into a pair of beams of separate polarization components,
   a first dispersive element receiving said pair of beams of separate polarization components, and operative to spatially disperse said wavelength components of each of said pair of beams of separate polarization components in a dispersion plane disposed at an angle to the plane in which said polarization components are split;
   a first focusing element receiving said wavelength components of each of said pair of beams of separate polarization components from said first dispersion element, without any intervening polarization manipulation element;
   a polarization modulating element disposed in the focal region of said first focusing element, without any intervening polarization dependent deflection element between said first focusing element and said polarization modulating element, said polarization modulating element being pixelated generally along the direction of the dispersion such that each pixel is associated with a separate wavelength component, each pixel of said polarization modulating element being operative to change the state of the polarization of light passing through said pixel according to a control signal applied to said pixel;
   a second focusing element receiving said light after passing through said polarization modulating element;
   a second dispersive element receiving light from said second focusing element, and operative to combine said separate wavelength components of each of said pair of beams into multi-wavelength beams; and
   a polarization beam combiner having two output ports, said polarization beam combiner receiving each of said pair of multi-wavelength beams, and operative to combine said separate polarization components such that each wavelength component of said at least one input beam is directed to one of said two output ports according to the control signal applied to said pixel associated with said wavelength.

2. A wavelength dependent switch according to claim 1, wherein said polarization modulating element is a liquid crystal element.

3. A wavelength dependent switch according to claim 1, wherein said angle is such that said dispersion plane is essentially orthogonal to said plane in which said polarization components are split.

4. A wavelength dependent switch according to claim 1, wherein said separate polarization components are two orthogonal components.

5. A wavelength dependent switch according to claim 1, wherein said polarization beam splitter also comprises a second input port, such that said switch is operative to switch a wavelength component of a signal input to either of said first and said second input ports, to either of said output ports, according to the control signal applied to said pixel associated with said wavelength component.

6. A wavelength dependent switch according to claim 1 and also comprising a half wave plate disposed in juxtaposition to said polarization modulating element, operative to reduce polarization dependent losses in the switch.

7. A wavelength dependent switch according to claim 1, and also comprising a first half wave plate disposed in the path of one of said pair of beams of separate polarization components emerging from said polarizing beam splitter; and a second half wave plate disposed in the path of another one of said pair of beams of separate polarization components entering said polarizing beam combiner, such that polarization dependent losses in the switch are reduced.

8. A wavelength dependent switch according to claim 1 and wherein at least one of said input beams is input to said switch by means of a multiple fiber collimator, such that said switch operates as a multiply parallel wavelength selective switch.

9. A wavelength dependent switch module comprising a plurality of wavelength dependent switches according to claim 1, and wherein at least two of said wavelength dependent switches utilize a common one of at least one of a dispersive element, a focusing element and a polarization modulating element.

10. A wavelength dependent switch according to claim 1 and wherein at least one of said polarization beam splitter and said polarization beam combiner is of a split prism construction.

11. A wavelength dependent switch according to claim 1 and wherein at least one of said polarization beam splitter and said polarization beam combiner is of birefringent crystal construction.

12. A wavelength dependent switch according to claim 1 and wherein said at least one input beam comprises one input beam, such that said switch operates as a 1×2 switch.

13. A wavelength dependent switch according to claim 1 and wherein said at least one input beam comprises one input beam, and only one of said two output ports is used such that said switch operates as a 1×1 switch.

14. A wavelength dependent switch according to claim 1 and wherein said at least one input beam comprises two input beams, such that said switch operates as a 2×2 switch.

15. A wavelength dependent switch, comprising in sequence:
   a polarization beam splitter having a first and second port, at least one of said ports receiving an input beam comprising at least two wavelength components, said polarization beam splitter being operative to spatially split each of said at least one input beam into a pair of beams of separate polarization components;
   a dispersive element receiving said pair of beams of separate polarization components, and operative to spatially disperse said wavelength components of each of said pair of beams of separate polarization components in a dispersion plane disposed at an angle to the plane in which said polarization components are split;
   a focusing element receiving said wavelength components of each of said pair of beams of separate polarization components from said dispersion element, without any intervening polarization manipulation element;
   a polarization modulating element disposed in the focal region of said focusing element without any intervening polarization dependent deflection element between said focusing element and said polarization modulating element, said polarization modulating element being pixelated generally along the direction of the dispersion such that each pixel is associated with a separate wavelength component, each pixel of said polarization modulating element being operative to change the state of the polarization of light passing through said pixel according to a control signal applied to said pixel; and a reflecting surface operative to reflect said light back in sequence through said pixelated polarization modulating element, said focusing element, said dispersive element and said polarization beam splitter, such that each wavelength component of said light is output to one of said first and second ports according to the control signal applied to said pixel associated with said wavelength.

16. A wavelength dependent switch according to claim 15, wherein said polarization modulating element is a liquid crystal element.

17. A wavelength dependent switch according to claim 15, wherein said angle is such that said dispersion plane is essentially orthogonal to said plane in which said polarization components are split.

18. A wavelength dependent switch according to claim 15, wherein said separate polarization components are two orthogonal components.

19. A wavelength dependent switch according to claim 15 and also comprising a circulator disposed at at least one of said first and second ports, such that said input beam at said at least one of said first and second ports is separated from light output to said at least one of said first and second ports.

20. A wavelength dependent switch according to claim 15 and also comprising a dual fiber collimator disposed at at least one of said first and second ports, such that said input beam light at said at least one of said first and second ports is separated from light output to said at least one of said first and second ports.

21. A wavelength dependent switch module comprising a plurality of wavelength dependent switches according to claim 15 and wherein at least two of said wavelength dependent switches utilize a common one of at least one of a dispersive element, a focusing element and a polarization modulating element.

22. A wavelength dependent switch according to claim 15 and wherein said at least one input beam comprises one input beam, such that said switch operates as a 1×2 switch.

23. A wavelength dependent switch according to claim 15 and wherein said at least one input beam comprises one input beam, and only one of said first and second ports is used to output light, such that said switch operates as a 1×1 switch.

24. A wavelength dependent switch according to claim 15 and wherein said at least one input beam comprises two input beams, such that said switch operates as a 2×2 switch.

25. A wavelength dependent switch according to claim 15 and also comprising a quarter wave plate disposed in juxtaposition to said polarization modulating element, operative to reduce polarization dependent losses in the switch.

26. A wavelength dependent switch, comprising in sequence:
a polarization beam splitter having at least a first input port, for receiving at least one input beam having at least two wavelength components, and operative to spatially split each of said at least one input beam into a pair of beams of separate polarization components,
a first dispersive element receiving said pair of beams of separate polarization components, and operative to spatially disperse said wavelength components of each of said pair of beams of separate polarization components in a dispersion plane disposed at an angle to the plane in which said polarization components are split;
a first focusing element receiving said wavelength components of each of said pair of beams of separate polarization components;
a polarization modulating element disposed in the focal region of said first focusing element, said polarization modulating element being pixelated generally along the direction of the dispersion such that each pixel is associated with a separate wavelength component, each pixel of said polarization modulating element being operative to change the state of the polarization of light passing through said pixel according to a control signal applied to said pixel;
a second focusing element receiving said light after passing through said polarization modulating element;
a second dispersive element receiving light from said second focusing element, and operative to combine said separate wavelength components of each of said pair of beams into multi-wavelength beams; and
a polarization beam combiner having two output ports, said polarization beam combiner receiving each of said pair of multi-wavelength beams, and operative to combine said separate polarization components such that each wavelength component of said at least one input beam is directed to one of said two output ports according to the control signal applied to said pixel associated with said wavelength;
wherein said separate polarization components directed to a first one of said two output ports traverse essentially the same optical paths into said polarization beam combiner as those of said separate polarization components directed to a second one of said output ports.

27. A wavelength dependent switch according to claim 26, wherein said polarization beam splitter also comprises a second input port, such that said switch is operative to switch a wavelength component of a signal input to either of said first and said second input ports, to either of said output ports, according to the control signal applied to said pixel associated with said wavelength component, and
wherein said spatially split polarization components of said input beams from said first input port traverse essentially the same optical paths on exiting said polarization beam splitter as those of said spatially split polarization components of said input beams from said second input port.

28. A wavelength dependent switch, comprising in sequence:
a polarization beam splitter having a first and second port, at least one of said ports receiving an input beam comprising at least two wavelength components, and operative to spatially split each of said at least one input beam into a pair of beams of separate polarization components;
a dispersive element receiving said pair of beams of separate polarization components, and operative to spatially disperse said wavelength components of each of said pair of beams of separate polarization components in a dispersion plane disposed at an angle to the plane in which said polarization components are split;
a focusing element receiving said wavelength components of each of said pair of beams of separate polarization components;
a polarization modulating element disposed in the focal region of said focusing element, said polarization modulating element being pixelated generally along the direction of the dispersion such that each pixel is associated with a separate wavelength component, each pixel of said polarization modulating element being operative to change the state of the polarization of light passing through said pixel according to a control signal applied to said pixel; and a reflecting surface operative to reflect said light back in sequence through said pixelated polarization modulating element, said focusing element, said dispersive element and said polarization beam splitter, such that each wavelength component of said light is output to one of said first and second ports according to the control signal applied to said pixel associated with said wavelength;

wherein said spatially split polarization components of said input beams from said first input port traverse essentially the same optical paths on exiting said polarization beam splitter as those of said spatially split polarization components of said input beams from said second input port.

29. A wavelength dependent switch, comprising in sequence:

a polarization beam splitter having a first and second port, at least one of said ports receiving an input beam comprising at least two wavelength components, said polarization beam splitter being operative to spatially split each of said at least one input beam into a pair of beams of separate polarization components;

a dispersive element receiving said pair of beams of separate polarization components, and operative to spatially disperse said wavelength components of each of said pair of beams of separate polarization components in a dispersion plane disposed at an angle to the plane in which said polarization components are split;

a focusing element receiving said wavelength components of each of said pair of beams of separate polarization components from said first dispersion element;

a polarization modulating element disposed in the focal region of said focusing element without any intervening polarization dependent deflection element between said focusing element and said polarization modulating element, said polarization modulating element being pixelated generally along the direction of the dispersion such that each pixel is associated with a separate wavelength component, each pixel of said polarization modulating element being operative to change the state of the polarization of light passing through said pixel according to a control signal applied to said pixel; and a reflecting surface operative to reflect said light back in sequence through said pixelated polarization modulating element, said focusing element, said dispersive element and said polarization beam splitter, such that each wavelength component of said light is output to one of said first and second ports according to the control signal applied to said pixel associated with said wavelength, wherein said spatially split polarization components of said input beam from said first input port traverse essentially the same optical paths within said switch after exiting said polarization beam splitter as those of said spatially split polarization components of said input beam from said second input port.

* * * * *